Sept. 15, 1942.   F. BIEDERMANN   2,295,628
APPARATUS FOR THE REVERSAL OF COLOR NEGATIVES
Filed Nov. 13, 1940
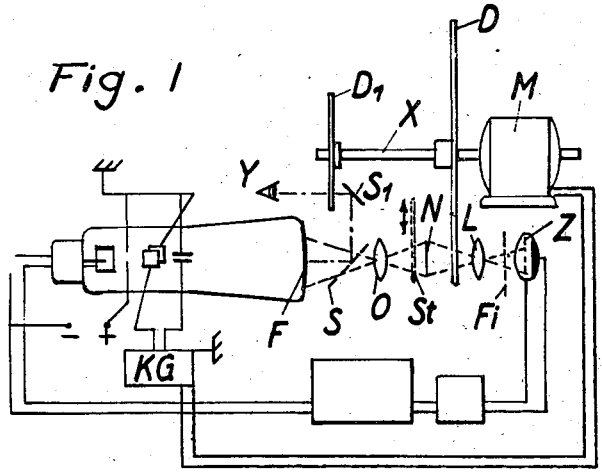
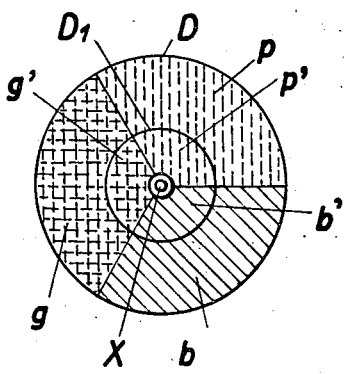
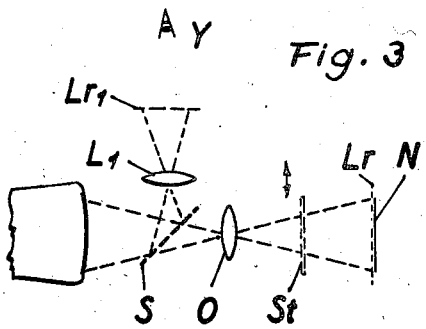
FRIEDRICH BIEDERMANN
INVENTOR.
BY
ATTORNEYS Patented Sept. 15, 1942

2,295,628

UNITED STATES PATENT OFFICE 2,295,628

APPARATUS FOR THE REVERSAL OF COLOR NEGATIVES

Friedrich Biedermann, Munich-Unterhaching, Germany, assignor to General Aniline & Film Corporation, New York, N. Y., a corporation of Delaware Application November 13, 1940, Serial No. 365,455

3 Claims. (Cl. 178—5.2)

My present invention relates to an apparatus for the reversal of color photographic negatives. This application is a continuation-in-part of my application Ser. No. 327,047, filed March 30, 1940, which is in turn a continuation-in-part of my application Ser. No. 242,627, filed November 26, 1938.

By the arrangement described in application Ser. No. 242,627 it is possible to observe negatives of stationary pictures or motion picture films directly as positive images on the fluorescent screen by the way of a cathode tube serving at the same time as transmitter and receiver. In this way one can estimate the adaptability of a photographic negative for printing in various branches of practical photography.

In order to apply such an apparatus for estimating the adaptability for printing of a color negative, it is necessary to register the brightness as well as the color value of the image by scanning it with colored light.

It is an object of the present invention to provide an apparatus for the reversal of photographic color negatives to be estimated by an electrical process.

A further object of the invention is to provide such apparatus comprising two filter sets dyed in the primary colors and arranged in such a way that filters of equal color are in the beams of light during the same time interval.

A still further object of the invention is to arrange the filter sets in the form of rotative discs driven by a common synchronous motor.

These and other objects of my invention will be apparent from the following description.

Reference is made to the accompanying drawing in which Figure 1 represents a view of a reversal apparatus according to my invention, Figure 2 represents a view of two filter discs dyed in equal colors and mounted on the same axle and Figure 3 represents a view of a reversal apparatus and linear screens employed therein.

In accordance with my invention two filter sets dyed in the primary colors are placed in such a way that one filter set is arranged between the color negative and the photocell and the other in the path of the rays with regard to the observer in such a manner that in scanning the image filters of equal color are simultaneously in the path of the rays. Preferably the two filter sets are rotatively mounted as discs or drums which are divided up into evenly large filter sectors corresponding to the primary colors. In order to attain a synchronous movement of the two filter discs, they are driven by a common motor or by different sources of power, which either keep each other synchronous or are kept so by being fed from a third source of power (network frequency). Moreover, it is of advantage to provide a mechanism for controlling the discs during their rotation in such a manner that equal colors are simultaneously in the light beams. In order to bring about a relationship between the changes of the image or the image lines and the changes of the color values, the time base responsible for the image frequency and the driving device for the filter discs may be synchronized. For observation purposes of the reversed images produced on the fluorescent screen a semitransparent mirror is placed into the path of the rays of the screen between said screen and a second mirror. Also linear screens instead of the rotative filter discs may be employed in the path of the rays, the screens being dyed in the primary colors. In order to compensate spectral deviations of the fluorescent light and of the sensitivity of the photocell, suitable filters are placed in the path of the rays.

The invention is exemplified by the accompanying drawing.

The scanning of color negatives necessary for the reversal is accomplished in such a manner that the colored negative N is registered in its respective brightness and color values according to the number of primary colors. In order to attain natural color reproduction, it is preferable to separate the colors at least into three primary colors, as it is done also in processes of color photography. For that purpose a color filter set D is employed in the path of the rays between color negative N and photocell Z, the filter set being rotatively mounted on the axle X driven by motor M. On the same live axle X a second filter set $D_1$ is mounted, the color sectors of which lie in the path of rays of observer Y. By mounting both filter discs on a common live axle, a synchronous rotation of the two filters is guaranteed. This is accomplished by using various sources of power, which either keep one another synchronous or are kept so by being fed from a third source of power (network frequency). As described in Figure 2, the two filter sets are employed in the form of rotatable discs D and $D_1$. The larger disc D and the smaller one $D_1$ contain sectors equal in size of angle and dyed in the primary colors, for instance, yellow, purple and blue-green ($g$, $p$, $b$ and $g'$, $p'$, $b'$). In order to observe through filter $D_1$ the reversed image on the fluorescent screen F, a semitransparent mirror S is employed in the beam path between fluorescent screen F and lens O. This mirror S deflects the light rays of fluorescent screen F towards a second mirror $S_1$ being placed behind the filter $D_1$. The semitransparent mirror S is dispensable, if the fluorescent image is observed either from the back or inclined from the front. In this case the filter disc $D_1$ must also lie naturally within the path of the rays. The two filter discs D and $D_1$ are arranged in such a manner that always corresponding color sectors of the filters D and $D_1$ lie simultaneously in the path of the rays. The speed of the filter discs may be regulated, for instance, in such a manner that one of the filters lies in the path of the rays during the first scanning of the picture. The next filter enters with the beginning of the second scanning and finally the third, dyed in a primary color, enters into the beam path during the following scanning, so that the whole image is registered in its color value after three alterations corresponding to one complete rotation of the discs D and $D_1$. It is therefore reversed for observer Y into a color positive. The alteration of color may take place line by line and must not necessarily be image by image. In such a case the filters corresponding to the three primary colors are arranged several times on the filter disc in order to avoid a too high number of revolutions. The corresponding changes of the image or image-lines and the color may be easily brought about by synchronizing motor M of the filter discs D, $D_1$ with time base KG supplying the image frequency. It can be accomplished also by feeding a common source of power to both parts. Such a combination, however, is not absolutely necessary. Since the filter discs are divided up into equal color sectors, the color separation with regard to the single components is always independent of the number of revolutions of the filter discs D, $D_1$. The fluorescent screen F, however, must emit light as white as possible so that the scanning may be done with pure primary colors. Moreover, the photocell Z must correspond evenly to the three primary colors. Suitable filters $F_i$ may be placed in the path of the rays, for instance between lens L and photocell Z, in order to compensate spectral deviations.

Instead of the filter discs D, $D_1$ rotatably mounted in the path of the rays it is possible to employ also fixed filters in the form of linear screens. Such an arrangement is exemplified in Figure 3. One linear screen $Lr$ is placed directly in front of the negative N, the other linear screen $Lr_1$ is arranged in the focal plane of the lens $L_1$ being in front of the deflecting mirror S. Both screens are dyed in equal colors and are to be arranged in such a manner that equal color components are in the path of the rays falling through corresponding image areas.

Between the lens O and the color negative N at least a control filter $St$ is arranged, in order to correct errors in color recognized as such in the reversal apparatus. This information will be most useful for the following printing process. The position of the control filter may be used to regulate a similar filter in the copying apparatus either by hand or by coupling with the control filter $St$ of the reversal apparatus. It is of advantage to use three controlling filters dyed in the three primary colors and having different translucency. The filters may be inserted at will.

I claim:

1. Apparatus for the reversal of photographic color negatives which comprises a cathode ray oscillograph provided with an anode, a cathode, a control electrode, a fluorescent screen and deflecting plates, a time base, said deflecting plates being adapted to derive their voltage from said time base and to deflect the cathode ray beam in two directions as in television so that said ray beam scans said fluorescent screen point by point, an objective between said screen and the color negative to be reversed, a photoelectric cell, a lens between said negative and said cell, a control device connected between said photocell on the one hand and said control electrode and cathode on the other hand forming a bridge circuit, said cell being one arm of said circuit and adapted to control said cathode ray beam in such a manner that the quantity of light falling on said cell from all points of said negative is substantially the same, and two filter sets dyed in equal primary colors, one of said filter sets being arranged in the ray beam path between said color negative and said photoelectric cell and the other filter in the ray beam path of the observer in such a manner that equal color components are always simultaneously in the path of the rays during scanning the image said filter sets being movable simultaneously for scanning each point of the negative and screen in each of said primary colors and said cell controlling said cathode ray beam, without altering the cross sectional size of the beam at the screen, in such a manner that the quantity of light falling on said cell from all points of the negative is substantially the same.

2. Apparatus for the reversal of photographic color negatives which comprises a cathode ray oscillograph provided with an anode, a cathode, a control electrode, a fluorescent screen and deflecting plates, a time base, said deflecting plates being adapted to derive their voltage from said time base and to deflect the cathode ray beam in two directions as in television so that said ray beam scans said fluorescent screen point by point, an objective between said screen and the color negative to be reversed, a photoelectric cell, a lens between said negative and said cell, a control device connected between said photocell on the one hand and said control electrode and cathode on the other hand forming a bridge circuit, said cell being one arm of said circuit and adapted to control said cathode ray beam in such a manner that the quantity of light falling on said cell from all points of said negative is substantially the same, and two filter sets arranged as rotatable discs being divided in equal filter sectors corresponding in number to the primary colors, one of said filter sets being arranged in the ray beam path between said color negative and said photoelectric cell and the other filter in the ray beam path of the observer in such a manner that equal color components are always simultaneously in the path of the rays during scanning the image said filter sets being movable simultaneously for scanning each point of the negative and screen in each of said primary colors and said cell controlling said cathode ray beam, without altering the cross sectional size of the beam at the screen, in such a manner that the quantity of light falling on said cell from all points of the negative is substantially the same.

3. Apparatus for the reversal of photographic color negatives which comprises a cathode ray oscillograph provided with an anode, a cathode, a control electrode, a fluorescent screen and deflecting plates, a time base, said deflecting plates being adapted to derive their voltage from said time base and to deflect the cathode ray beam in two directions as in television so that said ray beam scans said fluorescent screen point by point, an objective between said screen and the color negative to be reversed, a photoelectric cell, a lens between said negative and said cell, a control device connected between said photocell on the one hand and said control electrode and cathode on the other hand forming a bridge circuit, said cell being one arm of said circuit and adapted to control said cathode ray beam in such a manner that the quantity of light falling on said cell from all points of said negative is substantially the same, two filter sets arranged as rotatable discs being divided in equal filter sectors corresponding in number to the primary colors, one of said filter sets being arranged in the ray beam path between said color negative and said photoelectric cell and the other filter in the ray beam path of the observer in such a manner that equal color components are always simultaneously in the path of the rays during scanning the image, said filter sets being movably simultaneously for scanning each point of the negative and screen in each of said primary colors, and said cell controlling said cathode ray beam, without altering the cross-sectional size of the beam at the screen, in such a manner that the quantity of light falling on said cell from all points of the negative is substantially the same, and at least one correction filter dyed in a primary color and positioned between the negative and screen for avoiding undesired color tones.

FRIEDRICH BIEDERMANN.